(12) United States Patent
Dell'Acqua

(10) Patent No.: US 6,318,435 B1
(45) Date of Patent: Nov. 20, 2001

(54) MACHINE FOR THE MANUFACTURE OF A NON-SLIP FABRIC

(75) Inventor: Silvano Dell'Acqua, Gorla Maggiore (IT)

(73) Assignee: Plantex S.p.A., Gorla Maggiore (IT)

(*) Notice: Subject to any disclaimer, the term of this patent is extended or adjusted under 35 U.S.C. 154(b) by 0 days.

(21) Appl. No.: 09/270,923

(22) Filed: Mar. 16, 1999

Related U.S. Application Data

(63) Continuation-in-part of application No. 08/844,809, filed on Apr. 22, 1997, now Pat. No. 6,022,608.

(30) Foreign Application Priority Data

Jul. 29, 1996 (IT) .............................................. MI96A1609

(51) Int. Cl.[7] .............................. B32B 3/26; B32B 31/20; B32B 31/30; B32B 27/12
(52) U.S. Cl. .......................... 156/498; 156/501; 156/212; 156/244.21; 156/244.27
(58) Field of Search ................................... 156/212, 218, 156/285, 308.2, 498, 501, 244.21, 244.27

(56) References Cited

U.S. PATENT DOCUMENTS 3,954,368 * 5/1976 Kawakami ........................ 425/326 R
5,829,065 * 11/1998 Cahill .................................... 2/418
6,080,252 * 6/2000 Plourde .................................. 156/66

FOREIGN PATENT DOCUMENTS

0822065 * 2/1998 (EP).

* cited by examiner

*Primary Examiner*—Sam Chuan Yao
(74) *Attorney, Agent, or Firm*—Notaro & Michalos P.C.

(57) ABSTRACT

The invention relates to a machine for the manufacture of a non-slip fabric, comprising: a drum made to rotate around its own axis with a number of cup-shaped seatings on its surface, which seatings communicate with the inside of the drum, the inside of the drum being maintained at a pressure lower than atmospheric pressure; an extrusion head designed to extrude a thin plastic film onto the surface of the said drum; a second head, downstream of the previous one, designed to extrude a second, flat layer of thin plastic film; systems designed to bond the said films on the surface of the said drum; systems designed to convey a strip of fabric and bond it to the said films around the said drum; systems designed to cool the surface of said drum; systems designed to remove the laminate so obtained. The invention relates also to the relevant manufacturing method.

5 Claims, 2 Drawing Sheets

MACHINE FOR THE MANUFACTURE OF A NON-SLIP FABRIC

CROSS REFERENCE TO RELATED APPLICATION

This is a continuation-in-part of application Ser. No. 08/844,809 filed Apr. 22, 1997 now U.S. Pat. No. 6,022,608.

FIELD AND BACKGROUND OF THE INVENTION

This invention relates to a machine and a method for the manufacture of a non-slip fabric, in particular a heavy furnishing fabric intended, for example, for furnishing homes, cars, etc., such as wall-to-wall carpeting, mats and the like.

The fabric thus made, is characterised by the fact that it is bonded to two layers of plastic material, one of which is shaped to present a series of cup-shaped protuberances which will be described in greater detail below, and which make the surface of the fabric on which they are situated non-slip.

In accordance with a preferred version of the invention, the second, thinner, flat layer of plastic material is inserted between the fabric and the said layer of shaped plastic material.

The method in accordance with the invention involves (i) extrusion by an extrusion head of a thin film which is made to adhere to the surface of a rotating drum presenting a number of seatings of the same shape as the cups to be made; (ii) suction of air from the inside of the drum through the end wall of the said seatings to cause the deformation of the said film; (iii) extrusion of a second film by a second extrusion head; and (iv) bonding at the same time of the said two films to one another and to a fabric conveyed from a reel, to obtain the end product.

The invention relates to the field of equipment designed for the manufacture of heavy furnishing fabrics such as wall-to-wall carpeting, upholstery, mats and the like.

Fabrics of this kind having a non-slip layer of material are already known.

For example, fabrics bonded to a layer of spongy material or to a layer of rubber or other material with a low coefficient of friction are known.

However, these known products present a number of drawbacks.

Rubber-based materials contain numerous harmful products and are non-ecological.

Spongy materials are unhygienic because dust, bacteria, etc. accumulate in them, and because if wet they absorb water, with the resulting problems.

SUMMARY OF THE INVENTION

These drawbacks are eliminated by the non-slip fabric in accordance with the invention, which is characterised by the fact that it is bonded to a layer of plastic material shaped to present marked non-slip characteristics without the drawbacks of known materials.

The materials usable with the process in accordance with the invention could be various plastics such as EVA, polyethylene, polypropylene or other suitable materials which, though thin and deformable, are compact and waterproof, do not allow the proliferation of moulds and bacteria, and are fully recyclable.

BRIEF DESCRIPTION OF THE DRAWINGS

These and other advantages will appear more clearly from the detailed description below, provided by way of example but not of limitation, by reference to the annexed figures in which.

DESCRIPTION OF THE PREFERRED EMBODIMENT

Figure 1:
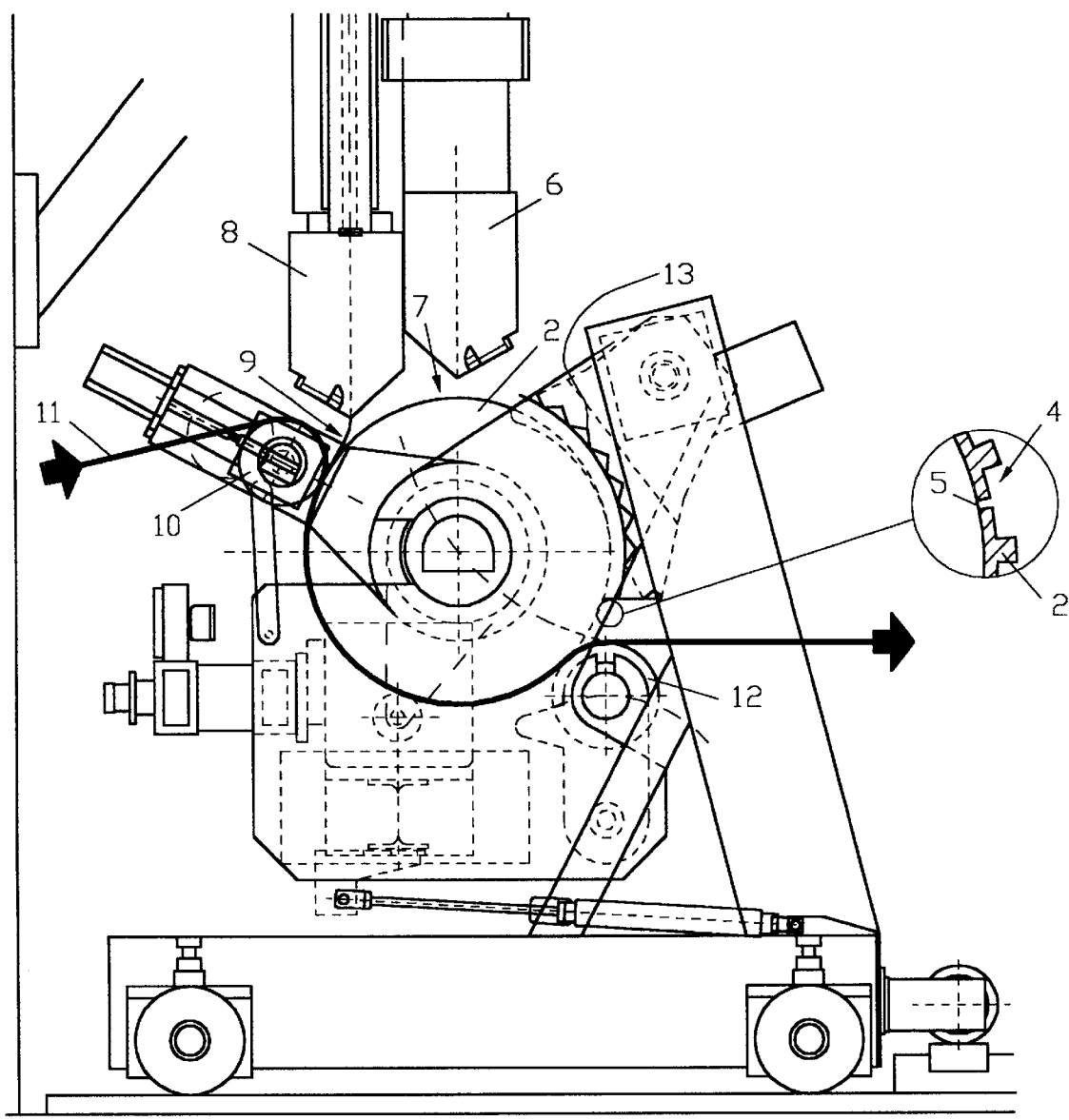
FIG. 1 schematically illustrates a view of a machine in accordance with the invention

With reference to FIG. 1, the machine for the manufacture of non-slip fabric in accordance with the invention comprises a frame 1 to which is fitted a cylinder or drum, schematically illustrated and indicated as no. 2, which is made to rotate around its own axis by a motor reducer unit shown by dotted lines near the center of the figure.

The cylinder surface is shaped, and presents a number of cup-shaped seatings 4, one of which is more clearly shown in cross-section in the enlarged detail in FIG. 1.

Each of these seatings communicates with the inside of the drum through a hole 5.

The inside of the drum is connected to suction devices not shown in the figure, which keep the interior of the drum at a pressure lower than atmospheric pressure.

An extrusion head 6 to which a die not shown conveys molten plastic such as EVA or other suitable material is located near the drum. The said material exits from head 6 in the form of a thin film, shown as no. 7.

Film 7 is deposited on the surface of the drum, to which it adheres by virtue of the difference in pressure between the inside and outside of the drum.

The same pressure difference deforms the film, still in the plastic state, causing it to take on the shape of seatings 4, and thus producing a number of cups all over the surface of the film.

Immediately downstream of extrusion head 6, a second head 8 extrudes a second, flat film 9, preferably thinner than the previous film, which is bonded to that film by pressure roll 10.

A strip of fabric 11 is also conveyed to this bonding area by a reel not shown in the figure; this fabric passes between pressure roll 10 and the two layers of film 7 and 9, so that the three materials are bonded together at the same time.

Downstream of roll 10, on the surface of cylinder 2, there is consequently a layer of plastic shaped to present a series of cups all over its surface, a second intermediate layer of flat plastic material, and a layer of fabric (in that order).

These three layers, which together form the "laminate", continue to adhere to the drum for as long as required to ensure sufficient cooling of the plastic layers, after which they are detached, passed over a bend wheel 12, and conveyed to collection devices not illustrated in the figure.

In the section between bend wheel 12 and extrusion head 6 on the cylinder there is a cover 13 designed to prevent external air from passing through the holes in the end wall of the cups in the cylinder and cancelling out the effect of the devices sucking out air from the inside.

Figure 3:
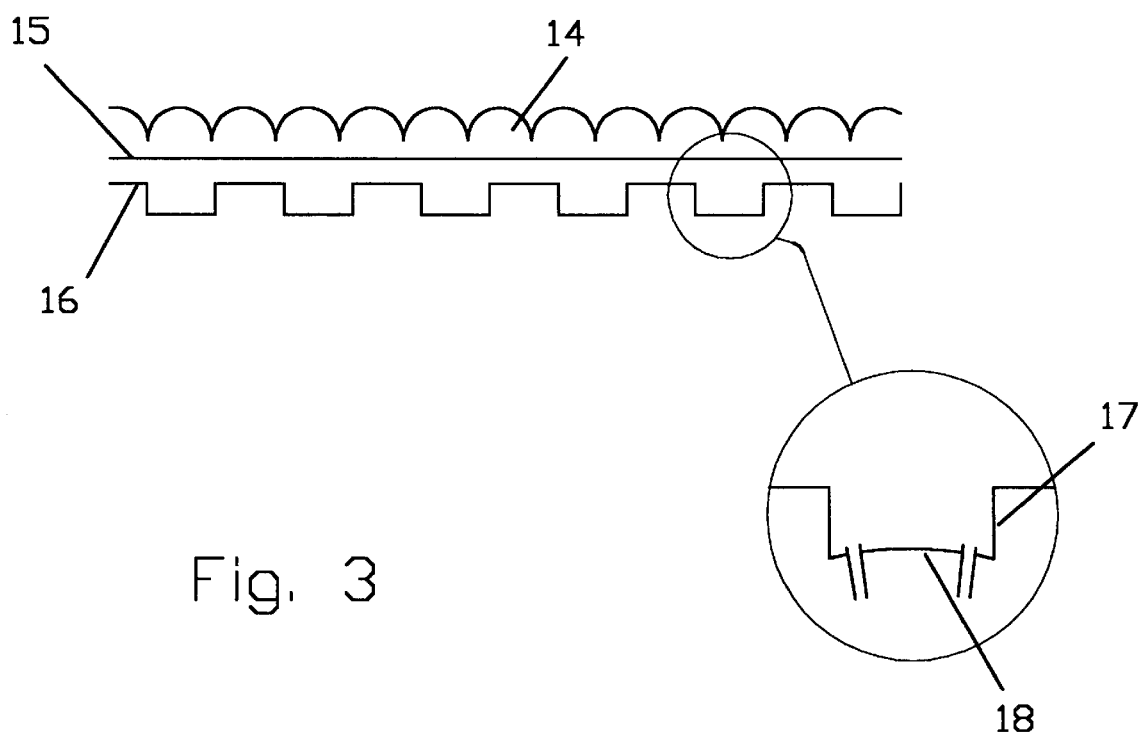
FIG. 3 shows a fabric produced by the method in accordance with the invention, in cross-section.

The finished fabric is shown in cross-section in FIG. 3, in which no. 14 indicates the fabric, 15 the intermediate layer and 16 the layer of deformed plastic material.

Figure 2:
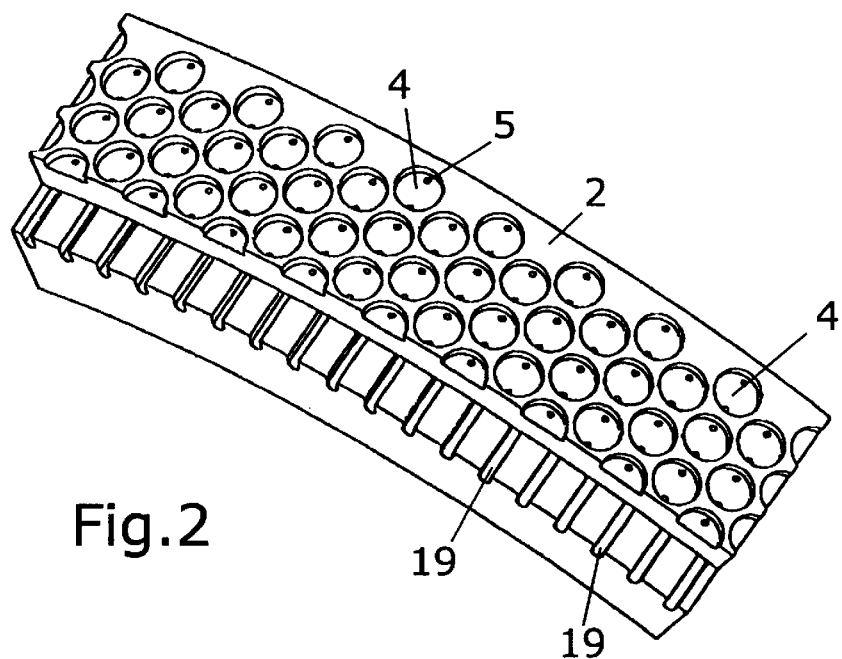
FIG. 2 shows a detail of the machine in accordance with the invention.

As already mentioned, layer 16 is shaped to present a number of cups, one of which is shown in the enlarged detail in FIG. 2.

These cups have a side wall 17 which is roughly straight and an end wall 18 which is flat or preferably concave, with the concavity facing outwards as shown in the detail in FIG. 2.

This particular shape of the cups has proved to improve the non-slip characteristics of the product.

However, because of this shape of the cups, the shaped inner layer 7 tends to adhere to the drum and to the walls of the seatings 4, so that it is difficult to remove the product.

It may happen that the force which is necessary to detach the product from the drum is higher than the adhesion force between the layers 7 and 9 or between the layer 9 and the fabric 11, thus the product can be damaged.

To avoid this drawback, the invention provides for a cooling system, to lower the temperature of the layer before the product is removed from the drum.

In particular, according to the invention a series of ducts or channels 19 (FIG. 2) is provided in the drum, near its surface, and channels are connected with means of known type, for circulating a cooling fluid such as refrigerated water, under the surface of the drum, near seatings 4.

This solution allows an easy and proof removal of the product.

The result is an ecological non-slip fabric which presents excellent hygiene characteristics.

An expert in the field could devise numerous modifications and variations, all of which should be deemed to fall within the scope of this invention.

What is claimed is:

1. A machine for manufacturing a non-slip fabric, comprising:
    a cylindrical drum having an interior, an axis, an inner surface, and an outer surface;
    a plurality of cup-shaped seatings on the outer surface, each seating having at least one hole therein, for communicating each seating with the interior of the drum;
    means for rotating the drum around its axis;
    means for maintaining the interior of the drum below atmospheric pressure for drawing air through the holes in the seatings and into the interior of the drum;
    a first extrusion head for extruding a first thin plastic film onto the surface of the drum, the seatings with the means for maintaining the interior of the drum below atmospheric pressure, forming cups in the first thin plastic film;
    a second extrusion head which is downstream from the first extrusion head with respect to the direction of rotation of the drum, for extruding a second thin plastic film onto the first thin plastic film;
    means for conveying a strip of fabric onto the second thin plastic film at a location downstream from the second extrusion head;
    means for simultaneously bonding the strip of fabric to the first and second thin plastic films to form a bonded laminate on the surface of the drum;
    means for cooling the outer surface of the drum to allow easy removal of the laminate from the drum, wherein said means for cooling defines an exterior surface adjacent to the inner surface of the drum, said means for cooling comprising a series of elongated and parallel channels for circulating a coolant, the channels being formed on the exterior surface of the cooling means; and
    means for removing the bonded laminate from the drum downstream of the means for simultaneously bonding.

2. A machine according to claim 1, wherein the means for simultaneously bonding comprises a pressure roll downstream of the second extrusion head for rolling the laminate against the drum to simultaneously bond the strip of fabric to the first and second thin plastic films.

3. A machine according to claim 2, wherein the second extrusion head is structured to extrude the second thin plastic film to be thinner than the first thin plastic film.

4. A machine according to claim 3, including a cover extending over the outer surface of the drum and between the means for removing laminate from the drum and the first extrusion head for keeping air from entering the holes in the seatings under the cover.

5. A machine according to claim 4, wherein the means for removing laminate from the drum comprises a bend wheel at the outer surface of the drum for receiving laminate from the drum, the bend wheel being upstream of the cover and downstream of the pressure roll.

* * * * *